United States Patent [19]

Pircon

[11] 4,358,433

[45] * Nov. 9, 1982

[54] HETEROGENEOUS PROCESS

[76] Inventor: Ladislav J. Pircon, 305 Canterberry La., Oak Brook, Ill. 60521

[*] Notice: The portion of the term of this patent subsequent to May 18, 1993, has been disclaimed.

[21] Appl. No.: 846,033

[22] Filed: Oct. 27, 1977

Related U.S. Application Data

[63] Continuation-in-part of Ser. No. 677,750, Apr. 16, 1976, Pat. No. 4,209,502, which is a continuation-in-part of Ser. No. 467,083, May 6, 1974, Pat. No. 3,957,465.

[51] Int. Cl.³ .............................................. C01B 1/00
[52] U.S. Cl. ...................................... 423/659; 55/90; 55/DIG. 36; 55/465; 48/180 R; 261/116
[58] Field of Search .................... 55/DIG. 36, 84-91, 55/465, 240, 241; 261/116, DIG. 54; 48/180 R; 423/659

[56] References Cited

U.S. PATENT DOCUMENTS

| | | | |
|---|---|---|---|
| 2,044,421 | 6/1936 | Cooke | 55/90 |
| 2,090,994 | 8/1937 | Brandes | 55/255 |
| 3,853,506 | 12/1974 | Pircon | 55/91 |
| 3,920,422 | 11/1975 | Pircon | 55/90 |
| 3,957,465 | 5/1976 | Pircon | 55/90 |
| 4,036,609 | 7/1977 | Pircon | 55/91 |
| 4,073,634 | 2/1978 | Pircon et al. | 55/73 |

FOREIGN PATENT DOCUMENTS 1389255 1/1965 France .................................. 55/84

OTHER PUBLICATIONS

Schutte & Koerting Co. Bulletin 4R, Cornwells Hghts., Bucks Cty.-Pa. 7/66, pp. 1-8.

*Primary Examiner*—Bernard Nozick
*Attorney, Agent, or Firm*—Thomas W. Speckman

[57] ABSTRACT

A process for promoting heterogeneous chemical and physical reactions in a gas stream using a casing which is substantially liquid and gas tight having a gas inlet in one end and a gas outlet in the other end; nozzle means within the casing having an entry toward said one end in communication with the gas inlet and an outlet toward said other end, said nozzle means having an effective cross-sectional area of about 2 to about 64 times the effective cross-sectional area of the outlet and the mean angle of convergence of the nozzle being about 6° to about 20°; means in the casing for introduction of reactant liquids and solids into the gas stream before said nozzle means; means for removing liquid and particulate matter from said other end of the casing following desired reaction; and means for separately removing the gas from said other end of the casing. The process of this invention is especially useful in providing a self-cleaning, non-clogging system for inducing high reaction kinetics without the normally required high turbulence and concurrent pressure drop of a scrubber; or packing to provide surface area such as used in conventional absorber.

13 Claims, 3 Drawing Figures

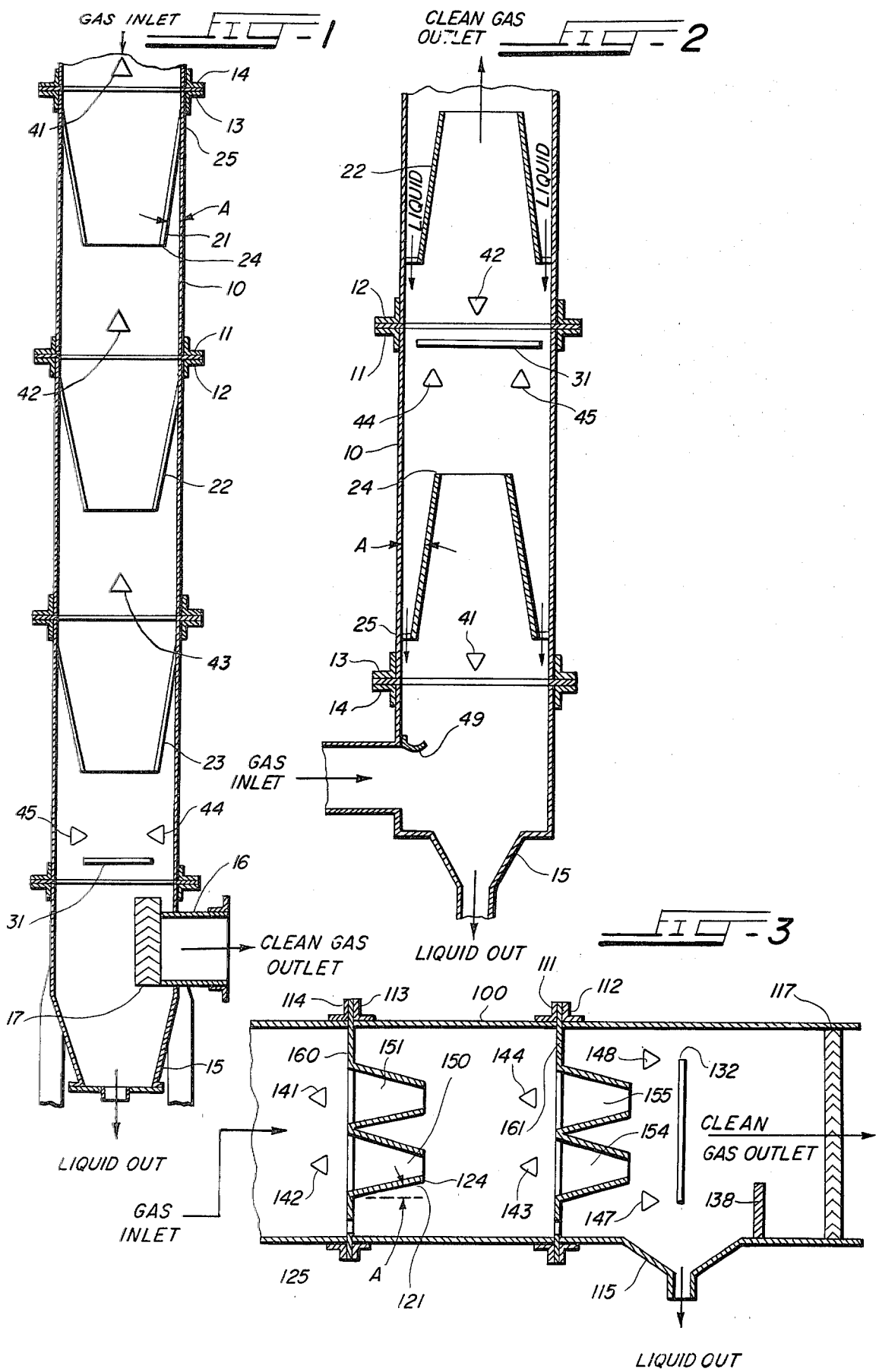

HETEROGENEOUS PROCESS

CROSS REFERENCE TO RELATED APPLICATIONS

This application is a continuation-in-part of co-pending application Ser. No. 677,750, now U.S. Pat. No. 4,209,502, filed Apr. 16, 1976, which is a continuation-in-part of application Ser. No. 467,083, filed May 6, 1974, now U.S. Pat. No. 3,957,465.

A wide number of reactors are known to the art in attempts to maximize both physical and chemical reactions between matter in different states, that is, gaseous, solid and liquid or any combination thereof. Most of the prior reactors for such purposes have been of a batch type such as atmospheric or pressurized tanks or kettles and agitated tank reactors. Continuous reactors have been used where surface reactions are conducted such as contactor packed column reactors, turbulent or fluidized bed absorber-reactors, high turbulent flow scrubbers, or wetted wall or other contact reactors.

The prior art heterogeneous reactors have not been as efficient as desired in that the reactions take a longer time than desired and in the case of continuous reactors, often times the slower reactions do not permit the desired completion of reaction to be achieved. Another serious disadvantage with prior continuous heterogeneous reactors has been problems of plugging when solid state materials are involved. Another serious disadvantage is high pressure drop, with concurrent high energy consumption, of high turbulent flow scrubbers or contact reactors.

It is an object of the present invention to provide a process for conducting reactions between reactants in different states which are highly efficient and useful in a wide variety of applications.

It is another object of this invention to provide a process for the conduct of reactions involving multiple states which induces high reaction kinetics.

Still another object of this invention is to provide a process utilizing an apparatus which is self-cleaning and non-clogging.

Yet another object of this invention is to provide a process for the conduct of highly efficient reactions between matter in multiple states in high temperature gas streams.

A further object of this invention is to provide a process for the conduct of reactions between matter in multiple states under high pressure conditions.

Another object of this invention is to provide a process for continuous reaction between matter of multiple states without the excessive energy losses accompanying high turbulence reactors or drag force losses due to packing in packed stages or columns.

A further object of this invention is to provide a process for evaporating liquids at a very high rate enabling the desired evaporation to take place in a short period of time and in a short path length.

Still another object of this invention is to provide a process to cool gases in contact with liquid which is caused to evaporate by the absorption of heat from the hot gas.

These and other objects and features of the invention will become apparent from the following description and figures showing preferred embodiments wherein:

FIG. 1 shows a cross-sectional view of one embodiment of an apparatus for use in the process of this invention using single nozzles in vertical series wherein the gas stream passes downwardly;

FIG. 2 shows a cross-sectional view of another embodiment of an apparatus for use in the process of this invention using single nozzles in vertical series wherein the gas stream passes upwardly; and FIG. 3 shows a cross-sectional view of another embodiment of the apparatus for use in the process of this invention having multiple nozzles in each stage and the gas stream flowing horizontally.

Referring to FIG. 1, the heterogeneous reactor is shown defined by outer casing 10. The cross-sectional shape of outer casing 10 is preferably cylindrical, but may be square, rectangular, triangular, hexagonal, or other symmetrical polygon shape, but other geometrical shapes symmetrical with respect to the axis of the apparatus are satisfactory, the principal requirement being that it enclose the apparatus in generally liquid and gas tight relationship while providing controlled gas flow through the interior portion. To allow maximum flexibility in the utilization and maintenance of the heterogeneous reactor, casing 10 may be fabricated in sections with the sections having flanges as shown by 11 and 13 at opposite ends for rigid coupling to adjacent casing sections having like flanges 12 and 14. Instead of the flanges as shown in FIG. 1, any suitable coupling means may be utilized. To allow for maximum economy of original fabrication and in installation of larger units the sections may be welded prior to shipment and erection.

FIG. 1 shows a three stage heterogeneous reactor. The heterogeneous reactor is arranged with its axis vertically having the reactant solid-liquid-gas inlet in the upper portion. The inlet may be in either a vertical or horizontal position. The gas flow is supplied to the top of casing 10 through the inlet at a velocity and pressure sufficient to carry it through the apparatus or flow may be controlled by an exhaust blower at the gas outlet. The heterogeneous reactor of this invention may be operated under positive or negative pressures suitable for the desired reaction or evaporation or cooling objective, limited only by the materials of construction. Casing velocities can be chosen to optimize the reactions such as low velocities where high absorption efficiencies are desired to high velocities where closed loop recycle without the need for demisting is permitted.

Spray 41 may be located in the central portion of inlet to cylinder 10 and introduces liquid or solid reactant, adsorbent, absorbent or coolant in droplet form to the reactant stream, the droplets being preferably in the order of about 40 to about 1500 microns in diameter. Larger droplets may be desired to compensate for evaporation when evaporative conditions exist if it is desired that the droplets leave the cone without excessive reduction in size of the droplet to achieve other desired reactions. Spray 41 is preferably a solid cone spray, but may, for certain applications, be a fan, hollow cone, or spinning disc atomizing spray, which by itself or in combination with several like it arranged in a pattern permitting the introduction of droplets of liquid across the entire cross section of the pollutant gas stream prior to entry of the gas stream into cone 21. Different sized liquid droplets are desired to provide maximum differential accelerations, decelerations and velocities through the apparatus, thus increasing reaction rates. It is desired that the spray pattern extend across the full area of entrance 25 of nozzle 21 and any suitable pattern of sprays or multiple sprays is satisfactory. Spray 41, designed to disperse solids, may also be used to introduce solid particles of the above specified sizes to the reactant stream at the entrance 25 of nozzle 21.

The reactant containing heterogeneous solid-liquid-gas stream enters converging nozzle 21 through entry 25. It is preferred that the entry be round and the nozzle conical, but other geometrical shapes symmetrical with respect to the axis of the apparatus are satisfactory. The cone ratio, defined as the effective cross-sectional area of the entry divided by the effective cross-sectional area of the outlet, should be about 2 to about 64, about 2 to about 36 being preferred, with about 2 to about 12 being especially preferred for many low pressure drop processes. By effective cross sectional area is meant the area at 90° to the axis of gas flow.

The length of the converging portion of the nozzle is determined by the angle of convergence shown as A in FIG. 1 and the nozzle ratio as defined above. It is preferred that the mean angle of convergence be about 6° to about 20°, about 8° to about 18° being preferred and about 12° to 16° especially preferred for many low pressure drop processes. By mean angle of convergence is meant the angle measured between a straight line drawn from the entry to the outlet and a vertical line as shown by A in FIG. 1. The sides of nozzle 21 do not need to be straight, but may be somewhat convex or concave. The sides at entry and/or outlet may be curved, or flared, to reduce pressure drops due to entry compression or outlet expansion.

When used to induce evaporation of a volatile liquid such as gasoline or other petroleum distillate or fuel into the intake stream of an internal combustion engine, I have found the cone ratio of about 2 to about 4 and an angle of convergence of about 12° to about 16° to be especially suitable.

For reactions not requiring separation of solid and liquid phases from the gas phase, or mass transfer phenomena such as associated with evaporative processes such as take place in the cooling tower, an impingement surface is not used in the gas stream beyond the nozzle exit. In FIG. 1, nozzles 21 and 22 do not have any impingement means, such as plates, associated with them. In FIG. 1, nozzle 23, the last nozzle in the series, does have an impingement means for removing liquid and solid particulates from the gas stream before the clean gas outlet. A suitable impingement plate is shown as 31 in FIG. 1. Impingement plate 31 is of sufficient size to have substantially all of the liquid-solid matter from the outlet of nozzle 23 impinge upon it while affording sufficient area between the impingement plate and cylinder 10 to allow passage of the gas around impingement plate without appreciable pressure drop. While impingement plate 31 is shown as a flat plate, a slightly concave plate to facilitate the passage of gas around the edges and to facilitate the removal of particulate matter may be utilized.

The distance from the outlet of the nozzle to the impingement surface 31 should be about 1.3 to about 2.5 times the diameter of outlet 24, about 1.6 to about 2.0 being preferred.

Additional sprays shown as 44 and 45 may be suitably located so that the spray therefrom washes particulate matter off impingement plate 31 for progress through the apparatus and discharge from the liquid outlet. Such sprays may be multiple sprays located around the periphery of impingement plate 31 or a satisfactory spray may be located in the central position or a spray may be located to spray obliquely upon the plate. When sufficient fluid is used, the impingement surface will be the fluid itself and the particulate matter will not strike or adhere to the impingement plate, but will be entrapped in the fluid. An important criteria of the sprays upon impingement plate 31 is that they provide sufficient fluid with sufficient force and direction to keep impingement plate 31 relatively free of particulate matter. The reactor may also be operated without the supplemental sprays to clean the impingement surfaces.

Because of the unitized construction of the apparatus for use in the process of this invention, as shown in FIG. 1, multiple nozzle-impingement means stages may be readily placed one on top of the other, resulting in the series of three units as shown in FIG. 1. One to about 6 of the series connected stages of nozzles are suitable for many heterogeneous reactors for use in this invention. Preferably 2 to 4 stages are utilized in series. Any number of stages of nozzles may be utilized in series as is found necessary to carry the chemical or physical reaction to desired completion. The nozzle stages placed in series may provide different reaction properties by the nozzles having different inlet-outlet area ratios and different angles of convergence and may be arranged with multiple nozzles in each stage to shorten the overall length of the apparatus. Where space requirements are limiting, the stages need not be in line, but may be at right angles to each other or any other angle to allow casing 10 to bend or curve to fit into available space. The number of stages or nozzles is controlled by the difficulty of reaction of the reactants, and with especially difficult materials, a greater number of stages may be necessary. This would also be influenced by the angles of convergence or effective cross-sectional area ratios of the nozzles.

Beneath the bottom stage, as shown in FIG. 1, is reservoir 15 for removal of the liquid and slurry. Exit means for the removal of the gas are also provided as shown in FIG. 1 as conduit 16. Either within the apparatus or external to the apparatus it may be preferred to have demister 17 in the clean gas effluent line to remove fine droplets of liquid remaining in the gas stream together with any solids or gases trapped by such droplets. Again, where closed loop recycling is involved in a chemical process, it may be desired to eliminate the demisters so that the droplets in mixture with the gas and solids may continue reacting until such mixture returns to the reactor.

The vertical arrangement of the converging nozzles is particularly advantageous since using such an apparatus having a demister and a nozzle ratio of 4 and a nozzle angle of approximately 15°, the pressure drop in one nozzle is 3.5 inches of water; with two nozzles in series is 5.7 inches of water; with three nozzles in series is 7.0 inches of water; and with four nozzles in series is 8.3 inches of water when an inlet velocity of approximately 2100 feet per minute was used. Thus, it is seen that the pressure drop of the vertical series of nozzles is advantageously less than cumulative. It has been found that the pressure drop across a two stage heterogeneous reactor, both stages having an impingement plate of the type shown in FIG. 1 designed to accommodate approximately 2100 feet per minute inlet velocity, is 0.9 inch of water using a nozzle ratio of 4 and a nozzle angle of approximately 12° when an inlet velocity of about 380 feet per minute was used in the removal of sulfur oxides from effluent gases from the combustion of coal.

The second stage nozzle 22, as shown in FIG. 1, is identical in configuration to the first stage. It is recognized, however, that the water or liquid chemical supplied to both the nozzles preceding the cone entrance and the nozzles supplying liquid to the impingement surface of the same stage or of different stages may be individually controlled. That is, the volumes may be different and the liquid used may be different in each instance.

The passing of the liquid, solid and gaseous reactant in the stream through nozzles such as 21, promotes intimate contact between the liquid, solid and gaseous reactant and results in desired high reaction rates. It is believed the high reaction efficiency of the heterogeneous reactor and process is due to differential velocities and differential acceleration and deceleration achieved by the combination of non-compressible matter passing with the compressible gas through nozzle 21 with the opportunity for relatively great expansion following exit from nozzle exit 24. In the reactant containing stream there is a size range of compressible and non-compressible matter. Additional particles added to the gas stream by addition of solids or liquid droplets are principally non-compressible as desired to increase the non-compressible component of the gas stream. Spray 41 may be used to introduce a wide selection of liquid or solid particle sizes to the gas stream and together with a relatively wide span of liquid or solid particle sizes in the inlet gas stream, promote extremely high collision rates and high compressible gas rates flowing past the non-compressible particles and droplets resulting in very highly efficient reactions.

FIG. 2 shows another embodiment of an apparatus in the process according to this invention. In the apparatus shown in FIG. 2, the gas stream passes upwardly through nozzles 21 and 22. The corresponding parts of the apparatus have the same numbers as in FIG. 1 and function in the same manner. In the apparatus shown in FIG. 2, the nozzles are mounted inwardly from casing 10 in such a manner that liquids and liquids containing solids may flow downwardly along the inside of casing 10. Liquid trough 49 is provided to prevent the liquid from passing over the gas inlet. The configuration shown in FIG. 2 is especially suitable for installation in existing or new conventional updraft stacks or a collection hood stack.

In order to minimize the height or length of the apparatus of my invention as shown in FIG. 1, I have found that multiple cones may be placed in each stage as shown in FIG. 3. The embodiment as shown in FIG. 3 has outer casing 100 which is substantially liquid and gas tight having gas inlet 118 at one end and clean gas outlet at the other end. Casing 100 may have flanges as shown by 111 and 113 at each end for coupling to adjacent casing sections having like flanges 112 and 114. The first stage as shown in FIG. 3 has plate 160 through which gas nozzles 150 and 151 are arranged. Any number of gas nozzles which have the properties as previously set forth, are suitable, from about 2 to about 6 being preferred in a single stage.

In a similar manner to that previously described, liquid or solid particles may be added by sprays above the gas nozzle inlets, such as sprays 141 and 142 above the inlet to nozzles 151 and 150, respectively. There is no impingement means beyond the outlet of nozzles 150 and 151 and the gas expands prior to entry into the nozzles of the second stage.

The gas stream passes through the converging nozzles and may impinge upon an impingement surface beyond the nozzle exits as exemplified by impingement plate 132. As previously described, the impingement surface may be an impingement plate shown and may have liquid sprays to aid washing particulate matter off the impingement plate shown as 147 and 148. The impingement plate beyond multiple nozzles may also be a series of separate plates having a geometry such that a gas flow passes from each nozzle for impingement upon a corresponding impingement surface following which the gas flows freely around that impingement surface for passage to the volume beneath the impingement plate assembly.

Liquid well 115 is provided for removal of liquid containing particulate and/or chemical matter and means for its removal. Drainage holes may also be provided in the plates holding the nozzles as shown so that liquid well 115 will drain the entire apparatus. Exit means are shown for removal of the gas from the end of the apparatus opposite the gas inlet. A demister shown as 117 is preferred when the apparatus is utilized with liquid sprays to remove fine droplets of liquid remaining in the clean gas.

With the unitized construction of the apparatus of this invention, multiple units may readily be placed at one end of one another resulting in a series of two units as shown in FIG. 3. One to about six of the series connected stages of multiple nozzles are suitable for an apparatus of this invention, preferably 2 to 4 nozzle-impingement means stages are utilized in series. The unitized arrangement referred to earlier in FIG. 1 would also apply here. Also, as seen from the drawings, the apparatus may be arranged so that the gas flow is downward, upward or horizontally. Of course, the gas flow may also be obliquely and as previously described, the apparatus may have turns or bends to fit into physical space requirements.

The process of this invention is suitable for absorption, gas-liquid, gas-solid or gas-liquid-solid chemical reactions, polymerization, vaporization, adsorption, stripping, gaseous cooling and condensation reactions which involve more than one phase of matter. The gas phase may be or carry a gaseous reactant or may be inactive with respect to the reaction desired. Likewise, introduced solids and liquids may be reactants or inactive with respect to the reaction desired. The process may involve a chemical or physical process separately or both chemical and physical processes may take place simultaneously. One stage may be particularly designed for a chemical or physical reaction and another stage in the same unit designed for the other type of reaction. It is thus seen that the apparatus and process of this invention provides great process versatility.

The process of this invention provides much greater latitude in operational conditions, including flow, than conventional scrubbers or absorbers using packing would permit. The apparatus and process of this invention also provides much greater latitude in operational conditions than pollution abatement particle removal devices. Operation of the apparatus and process of this invention is, to a great extent, dependent upon relative velocities in the nozzles and not to a great extent upon velocity of the introduced gas stream. An apparatus of this invention designed for 2100 FPM was operated at 18% of design flow rate, dropping the Reynolds Number to 18% of design, and satisfactory reaction of over 95% was obtained. Likewise, the liquid flow rate was increased by a factor of 8 while maintaining reactions of over 95%. Thus, liquid to gas ratio changes of 0.5 to 20 were effected while maintaining high reaction efficiencies. This demonstrates that the apparatus has the process versatility of responding to changing modes of process operation involving liquid recycle ratios and gas flow changes permitting it to function in operations from a gas cleaning system to being an integral part of a chemical process for manufacturing purposes within minimal adjustment, such as higher capacity liquid nozzles. By changing from liquid to solid spray nozzles the apparatus would operate in the dry mode at high temperatures. Conventional packed bed or Venturi scrubbers would not operate under such varied conditions without design changes to the apparatus.

The process of this invention for inducing chemical and physical reactions in gas streams comprises a gas stream and solid or liquid into one end of a substantially liquid and gas tight casing; passing the gas stream and solid or liquid through a nozzle within the casing and having an entry in communication with the gas inlet, the entry of the nozzle having an effective cross-sectional area of about 2 to about 64 times the effective cross-sectional area of the outlet and the means angle of convergence of the nozzle being about 6° to about 20°, the acceleration and deceleration of the gas stream causing at least two states of gas, solids and liquids to contact causing chemical and physical reaction of reactants in passing through the nozzle; removing the liquid and solid particulate matter from the other end of the casing; separately removing the gas from the other end of the casing. The liquids or solids and agglomerates thereof may be impinged upon an impingement means beyond the nozzle outlet for separation from the gas stream.

The following examples are set for illustration of specific embodiments of this invention and are not to be construed to limit the invention in any way.

EXAMPLE I

An apparatus as shown in FIG. 1 and previously described with respect to FIG. 1, was used to produce liquid fertilizer from pretreated defluorinated phosphate rock. Coal containing about 6.2 wt. percent sulfur on a dry basis was fed by an underfeed stoker and burned in a double pass fire tube boiler with excess air and the stack gases passed from the boiler into the bottom of a cooling tower similar to a single stage of the apparatus as shown in FIG. 2 without an impingement plate. The boiler effluent gas stream passed through the cooling tower and then through a two stage heterogeneous reactor as shown in FIG. 1 having impingement plates under each nozzle outlet. The cone ratio of inlet to outlet was about 4 to 1 and the angle of convergence was about 12°. Defluorinated phosphate rock, containing less than about 0.18% F, was pretreated by soaking in tap water for two weeks. Water and pretreated defluorinated phosphate rock only were added to a tank to obtain pH's for recycle of liquid at pH at 6.90 to nozzle sprays in the heterogeneous reactor and a pH of 6.50 in the liquid passing from the heterogeneous reactor to the cooling tower liquid spray, sulfur dioxide removal from the stack gas of 92.5% was obtained.

It was found that when ammonia was added to the system in addition to water and defluorinated phosphate rock as described above, removal efficiencies of sulfur oxides increased to in excess of 96% and conversion of the phosphate rock and ammonia reached 90% based upon reaction products of calcium sulfite, calcium sulfate and ammonium phosphate. This resulted in $SO_2$ effluent from the heterogeneous reactor of as low as 90 ppm while burning 6.2% coal, well below United States of America Federal Environmental Agency allowable amounts.

EXAMPLE II

A two stage heterogeneous reactor similar to the apparatus as shown in FIG. 2 was installed to treat the vapors issuing from a hamburger and onion frying grill. Fresh water was used in spray nozzles in the gas stream before each nozzle. It was found that the effluent stream was free from odors of hot grease, hamburger and onions. Return of the warm effluent stream to the room provides considerable heat conservation. The heat from the grills of a restaurant could be salvaged, conserving water by recycle, by adding appropriate oxidizing agents to the recycled solution to sanitize the air while deodorizing it.

EXAMPLE III

A single stage heterogeneous reactor of this invention having a single cone with the mean angle of convergence of 12°–15° and inlet to outlet area ratio of 2 to 3 was installed between a two barrel automobile carburetor and the manifold carburetor mount to further vaporize the incoming atomized gasoline. It was found that gasoline mileage increased up to 23% and $CO_2$ exhaust emission reduced by factors as large as ten times. A ratio of 2 to 4 was used in the same position with a four barrel carburetor resulting in a gasoline mileage increase from 10 to 17% without the benefit of optimized dwell, spark and carburetor adjustments achieved with the two barrel unit.

While in the foregoing specification this invention has been described in relation to certain preferred embodiments thereof, and many details have been set forth for purpose of illustration, it will be apparent to those skilled in the art tht the invention is susceptible to additional embodiments and that certain of the details described herein can be varied considerably without departing from the basic principles of the invention.

I claim:

1. A low pressure drop process having pressure drop of less than that characteristic of a process using a high turbulence reactor for inducing heterogeneous chemical and physical reactions in gas streams by cocurrent movement of said gas stream and reactant liquids or solids comprising:

passing a gas stream and solid reactant or liquid reactant into one end of a substantially liquid and gas tight casing;

passing the gas stream and solid or liquid at entry velocities under 2100 feet per minute through a continually converging nozzle symmetrical with respect to its axis within the casing and having an entry in communication with said one end of said casing, the entry of the nozzle having an effective cross-sectional area of about 2 to about 64 times the effective cross-sectional area of the outlet and the mean angle of convergence of the nozzle being about 6° to 20°, differential velocities and differential accelerations and decelerations between noncompressible liquids or solids and compressible gas substantially only along the axis of the nozzle causing at least two states of gas, solid and liquid to contact causing chemical and physical reaction of reactants in passing through the nozzle;

removing the liquid and particulate matter from the casing; and separately removing the gas from the other end of the casing.

2. The process of claim 1 additionally impinging solids and liquids upon an impingement means beneath the nozzle outlet.

3. The process of claim 1 wherein the pressure drop is 3.5 inches of water and less across each stage.

4. The process of claim 1 wherein the mean angle of convergence of said nozzle is about 8° to 18°.

5. The process of claim 1 wherein said process is the physical reaction of liquid evaporation.

6. The process of claim 5 wherein the effective cross-sectional area of the entry of the nozzle is about 2 to about 4 times the cross-sectional area of the outlet of the nozzle and the mean angle of convergence is about 12° to 16°.

7. A low pressure drop process having pressure drop of less than that characteristic of a process using a high turbulence reactor for inducing heterogeneous physical reactions in gas streams by cocurrent movement of said gas stream and reactant liquids or solids comprising:
    passing a gas stream and solid reactant or liquid reactant into the upper end of a substantially liquid and gas tight casing;
    passing the gas stream and solid or liquid at entry velocities under 2100 feet per minute through a continually converging nozzle symmetrical with respect to its axis within the casing and having an entry in communication with said upper end of said casing, the entry of the nozzle having an effective cross-sectional area of about 2 to about 64 times the effective cross-sectional area of the outlet and the mean angle of convergence of the nozzle being about 6° to 20°, differential velocities and differential accelerations and decelerations of non-compressible liquids or solids and compressible gas substantially only along the axis of the nozzle causing at least two states of gas, solid and liquid to contact causing physical reaction of reactants in passing through the nozzle;
    removing the liquid and particulate matter from the lower end of the casing; and
    separately removing the gas from the lower end of the casing.

8. The process of claim 7 additionally impinging solids and liquids upon an impingement means beneath the nozzle outlet.

9. The process of claim 7 wherein the pressure drop is 3.5 inches of water and less across each stage.

10. The process of claim 7 wherein the mean angle of convergence of said nozzle is about 8° to 18°.

11. The process of claim 7 wherein the gas stream passes through 2 to about 6 single nozzle stages in series within said casing.

12. The process of claim 7 wherein said process is the physical reaction of liquid evaporation.

13. The process of claim 12 wherein said liquid evaporation is evaporation of liquid fuel in the intake gas stream of an internal combustion engine by passing said gas stream and liquid fuel through said nozzle in the intake to an internal combustion engine, said effective cross-sectional area of the entry of the nozzle is about 2 to about 4 times the cross-sectional area of the outlet of the nozzle and the mean angle of convergence is about 12° to 16°.

* * * * *